United States Patent
Avudaiyappan

(10) Patent No.: US 9,619,382 B2
(45) Date of Patent: Apr. 11, 2017

(54) SYSTEMS AND METHODS FOR READ REQUEST BYPASSING A LAST LEVEL CACHE THAT INTERFACES WITH AN EXTERNAL FABRIC

(71) Applicant: Intel Corporation, Santa Clara, CA (US)

(72) Inventor: Karthikeyan Avudaiyappan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 13/970,311

(22) Filed: Aug. 19, 2013

(65) Prior Publication Data

US 2015/0052304 A1    Feb. 19, 2015

(51) Int. Cl.
| | |
|---|---|
| G06F 12/00 | (2006.01) |
| G06F 13/00 | (2006.01) |
| G06F 13/28 | (2006.01) |
| G06F 12/0811 | (2016.01) |
| G06F 12/0897 | (2016.01) |
| G06F 9/00 | (2006.01) |

(52) U.S. Cl.
CPC .......... G06F 12/0811 (2013.01); G06F 9/00 (2013.01); G06F 12/0897 (2013.01)

(58) Field of Classification Search
CPC ..... G06F 12/0811; G06F 12/0897; G06F 9/00
USPC ................................................. 711/122, 146
See application file for complete search history.

(56) References Cited

U.S. PATENT DOCUMENTS

| | | | | |
|---|---|---|---|---|
| 4,847,758 | A | * | 7/1989 | Olson ................. G06F 12/0884 365/189.05 |
| 4,858,111 | A | * | 8/1989 | Steps ................. G06F 12/0804 711/118 |
| 5,301,287 | A |   | 4/1994 | Herrell et al. |
| 5,513,344 | A | * | 4/1996 | Nakamura ............. G11C 29/08 714/42 |
| 5,603,010 | A | * | 2/1997 | Dodd .................. G06F 13/4239 711/154 |
| 5,983,332 | A |   | 11/1999 | Watkins |
| 6,021,485 | A |   | 2/2000 | Feiste et al. |
| 6,141,747 | A |   | 10/2000 | Witt |
| 6,215,497 | B1 | * | 4/2001 | Leung ....................... G06T 1/60 345/419 |
| 6,366,984 | B1 |   | 4/2002 | Carmean et al. |
| 6,401,192 | B1 | * | 6/2002 | Schroter ................. G06F 9/383 711/137 |
| 6,457,075 | B1 | * | 9/2002 | Koutsoures ............. G06F 13/28 710/35 |
| 6,505,277 | B1 |   | 1/2003 | Arimilli et al. |
| 7,177,985 | B1 | * | 2/2007 | Diefendorff ........ G06F 12/0862 711/118 |

(Continued)

Primary Examiner — Sheng-Jen Tsai
(74) Attorney, Agent, or Firm — Nicholson, De Vos, Webster & Elliot, LLP

(57) ABSTRACT

Methods for read request bypassing a last level cache which interfaces with an external fabric are disclosed. A method includes identifying a read request for a read transaction, generating a phantom read transaction identifier for the read transaction and forwarding the read transaction with the phantom read transaction identifier beyond a last level cache before detection of a hit or miss with respect to the read transaction. The phantom read transaction identifier acts as a pointer to a real read transaction identifier.

15 Claims, 4 Drawing Sheets

(56) References Cited

U.S. PATENT DOCUMENTS

| | | |
|---|---|---|
| 7,334,108 B1 | 2/2008 | Case et al. |
| 7,343,477 B1 | 3/2008 | Thatipelli et al. |
| 7,594,079 B2 | 9/2009 | Yu et al. |
| 2001/0013870 A1 | 8/2001 | Pentkovski et al. |
| 2003/0005226 A1* | 1/2003 | Hong .................. G06F 12/0846 711/119 |
| 2003/0018875 A1 | 1/2003 | Henry et al. |
| 2006/0031641 A1* | 2/2006 | Hataida ............... G06F 12/0833 711/144 |
| 2006/0179284 A1 | 8/2006 | Jensen et al. |
| 2007/0288725 A1 | 12/2007 | Luick |
| 2009/0089510 A1* | 4/2009 | Lee ..................... G06F 12/0831 711/141 |
| 2009/0150622 A1* | 6/2009 | Allen, Jr. ............ G06F 12/0806 711/154 |
| 2010/0011166 A1 | 1/2010 | Yu et al. |
| 2010/0049952 A1 | 2/2010 | Eddy et al. |
| 2011/0040955 A1* | 2/2011 | Hooker ............... G06F 9/30043 712/225 |
| 2011/0145513 A1* | 6/2011 | Iyer .................... G06F 12/0844 711/141 |
| 2012/0072667 A1* | 3/2012 | Anderson ........... G06F 12/0862 711/122 |
| 2014/0013027 A1* | 1/2014 | Jannyavula Venkata ............. G06F 12/0866 711/103 |
| 2014/0095784 A1 | 4/2014 | Tran et al. |
| 2014/0173343 A1 | 6/2014 | Ahmed et al. |
| 2014/0205012 A1 | 7/2014 | Lee et al. |
| 2014/0317357 A1* | 10/2014 | Kaplan ............... G06F 12/0862 711/137 |

\* cited by examiner

SYSTEMS AND METHODS FOR READ REQUEST BYPASSING A LAST LEVEL CACHE THAT INTERFACES WITH AN EXTERNAL FABRIC

A cache in a central processing unit is a data storage structure that is used by the central processing unit of a computer to reduce the average time that it takes to access memory. It is a data storage structure that stores copies of data that are located in the most frequently used main memory locations. Moreover, a cache is a data storage structure that is smaller and that may be accessed more quickly than main memory.

Conventional caches can include separate cache components that have a hierarchical relationship. For example, conventional cache systems can include level 1, level 2 and level 3 cache structures. Such cache structures are accessed by means of instructions called loads and stores.

A Last Level Cache (LLC) is the last cache in the hierarchy of caches. LLCs typically interface to an external fabric. When a read request to an LLC misses in the LLC, a read transaction is sent out on the external fabric to fetch data from main memory, a device or another processor that is connected to the fabric. A read transaction on the fabric must have an "ID". This ID is referred to herein as a read transaction ID. The external fabric returns data back to a read transaction, along with the read transaction ID.

In conventional systems, the read transaction ID is either wholly or partially generated by the LLC. For example, if the read transaction ID is 10 bits in length, the LLC may supply its lower 5 bits. In addition, the read transaction ID bits that are generated by the LLC, can act as a pointer to a read queue that is located in the LLC, where read data, when it is returned by the fabric, is stored. In the aforementioned example where the LLC provides 5 bits of the read transaction ID, the read queue size is 32 entries.

When a read request accesses the LLC, a hit or a miss can result. If the access results in a miss, a read transaction is sent out on the external fabric. The process of detecting a hit or a miss prior to sending a read transaction out onto the external fabric, requires a number of cycles in most processors. These cycles are spent accessing the LLC Tag SRAM to detect said hit or miss. The time spent in accessing the LLC Tag SRAM prior to sending a read transaction onto the external fabric can have negative performance implications.

SUMMARY

In most conventional processors the process of detecting a hit or a miss in a last level cache (LLC) prior to sending a read transaction out onto the external fabric, requires a number of cycles. These cycles are spent accessing the last level cache tag SRAM. The time spent in accessing the last level cache tag SRAM prior to sending a read transaction onto the external fabric can have negative performance implications. Methods for read request bypassing a last level cache which interfaces with an external fabric are disclosed that addresses these shortcomings. However, the claimed embodiments are not limited to implementations that address any or all of the aforementioned shortcomings. As a part of a method, a read request for a read transaction is identified, a phantom read transaction identifier for the read transaction is generated and the read transaction is forwarded with the phantom read transaction identifier beyond a last level cache before detection of a hit or miss with respect to the read transaction (the phantom read transaction identifier acts as a pointer to a real read transaction identifier). As such, delays related to detecting a hit/miss and generating a read transaction ID are avoided.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
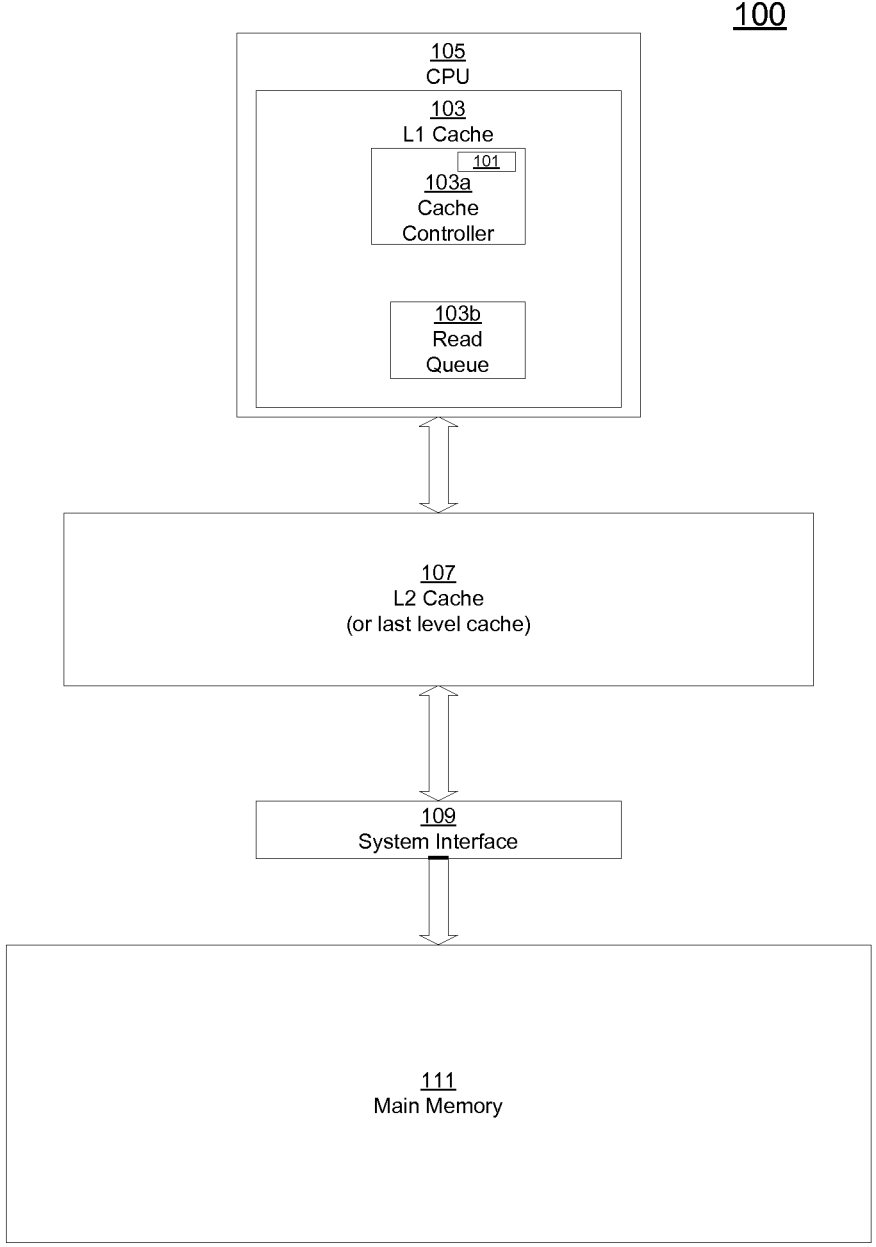
FIG. 1A shows an exemplary operating environment of a system for read request bypassing of a last level cache that interfaces with an external fabric according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result.

The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "generating" or "forwarding" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of Systems and Methods for Read Request Bypassing a Last Level Cache which Interfaces with an External Fabric According to One Embodiment FIG. 1A shows an exemplary operating environment 100 of a system 101 for read request bypassing of a last level cache that interfaces with an external fabric according to one embodiment. System 101, responsive to a read request, initiates the sending of a read transaction with a phantom transaction identifier (e.g., transaction ID) onto the external fabric before a hit/miss in a last level cache is determined. As such, delays related to detecting a hit/miss and generating a read transaction ID are avoided. FIG. 1A shows system 101, level one (L1) cache 103, cache controller 103a, read queue 103b, CPU 105, level two (L2) cache 107 (or last level cache), system interface 109 and main memory 111.

Referring to FIG. 1A, level one (L1) cache 103 is the primary cache of the processor, and is a static memory which can be integrated with the processor core and is used to store information recently accessed by the processor. In one embodiment, read transactions that miss in level one cache 103 are sent to level two (L2) cache 107. In one embodiment, level one (L1) cache 103 includes cache controller 103a and read queue 103b.

Level 2 cache 107 is the secondary cache of the processor and like level one (L1) cache 103 is used to store recently accessed information. In the FIG. 1A embodiment, level 2 cache 107 is a last level cache in that it is the cache that interfaces with the external fabric. In one embodiment, read transactions that miss in level one (L1) cache 103 bypass level 2 cache 107 and are sent into the external fabric to obtain data from main memory, another processor or other device connected to the fabric.

Referring to FIG. 1A, system 101 upon identifying a read request for a read transaction, generates a phantom read transaction identifier for the read transaction and forwards the read transaction with the phantom read identifier beyond a last level cache (e.g., level two (L2) cache 107) before the detection of a hit or miss with respect to the read transaction in the last level cache (e.g., level two (L2) cache 107). In one embodiment, the phantom read transaction identifier can comprise a bit that is used to differentiate the phantom read transaction identifier from the real read transaction identifier. In one embodiment, when a read transaction with phantom read transaction ID is sent out onto the external fabric, one of the following three possible events occurs: (1) the read request accesses the last level cache and detects a miss, (2) the read request accesses the last level cache and detects a hit, or (3) the read request does not access the last level cache at all. In one embodiment, for events other than event (1), the read transaction that is sent onto the external fabric is canceled. For event (1), the last level cache has to convert the phantom read transaction identifier to a pointer to the real read transaction ID.

Referring again to FIG. 1A, main memory 111 includes physical addresses that store information that is copied into cache. In one embodiment, main memory 111 is accessed for data associated with a load request when a miss occurs in the cache preceding the last level cache. More specifically, the last level cache is bypassed. Also shown in FIG. 1A is system interface 109.

Operation

Figure 1B:
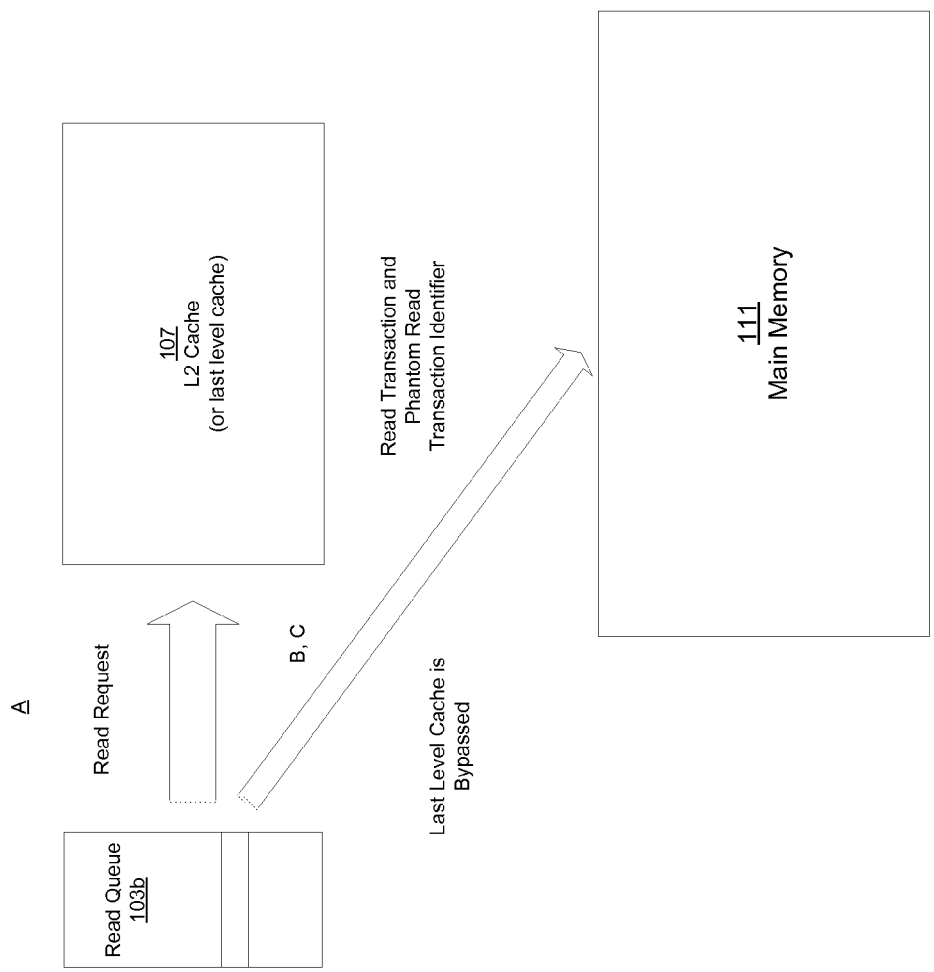
FIG. 1B illustrates an exemplary operation of the system for read request bypassing of a last level cache that interfaces with an external fabric according to one embodiment.

FIG. 1B illustrates operations performed by system 101 for read request bypassing of a last level cache that interfaces with an external fabric according to one embodiment. These operations, which relate to read request bypassing of a last level cache that interfaces with an external fabric are only exemplary. It should be appreciated that other operations not illustrated by FIG. 1B can be performed in accordance with one embodiment.

Referring to FIG. 1B, at A, a read request associated with a read transaction is accessed.

At B, a phantom read transaction identifier is generated for the read transaction.

At C, a read transaction is forwarded with the phantom read identifier beyond a last level cache (e.g., L2 cache 107) before the detection of a hit or miss with respect to the read transaction in the last level cache. Referring to FIG. 1B, the read transaction and the phantom read transaction identifier are shown as being forwarded directly to main memory 111 and as bypassing L2 cache 107.

Figure 2:
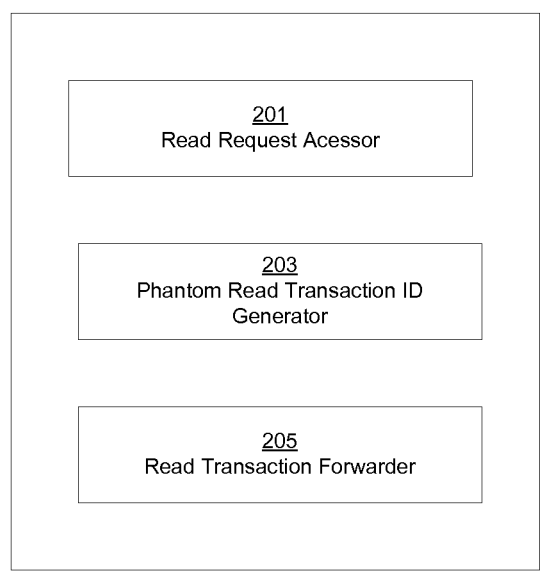
FIG. 2 shows components of a system for read request bypassing of a last level cache that interfaces with an external fabric according to one embodiment.

Components of System for Read Request Bypassing a Last Level Cache which Interfaces with an External Fabric According to One Embodiment FIG. 2 shows components of a system 101 for read request bypassing of a last level cache that interfaces with an external fabric according to one embodiment. In one embodiment, components of system 101 implement an algorithm for read request bypassing of a last level cache that interfaces with an external fabric. In the FIG. 2 embodiment, components of system 101 include read request accessor 201, phantom read transaction ID generator 203 and read transaction forwarder 205.

Read request accessor 201 accesses a read request for a read transaction.

Phantom read transaction ID generator 203 generates a phantom read transaction identifier for the read transaction. Phantom read transaction ID generator 203 generates phantom read transaction identifiers for read requests that are not compositionally derived from real read transaction IDs.

Read transaction forwarder 205 forwards a read transaction with the phantom read transaction identifier beyond a last level cache before detection of a hit or miss with respect to the read transaction. In one embodiment, the phantom read transaction identifier comprises a pointer to a real transaction identifier. In one embodiment, when a read transaction with phantom read transaction identifier is sent out onto the external fabric, one of the following three possible events occurs: (1) the read request accesses the last level cache and detects a miss, (2) the read request accesses the last level cache and detects a hit, or (3) the read request does not access the last level cache at all. In one embodiment, for events other than event (1), the read transaction that is sent onto the external fabric is canceled. For event (1), the last level cache (e.g., L2 cache 107 in FIG. 1A) has to convert the phantom read transaction identifier to a pointer to real read transaction ID.

It should be appreciated that the aforementioned components of system 101 can be implemented in hardware or software or in a combination of both. In one embodiment, components and operations of system 101 can be encompassed by components and operations of one or more computer components or programs (e.g., a cache controller 103*a*). In another embodiment, components and operations of system 101 can be separate from the aforementioned one or more computer components or programs but can operate cooperatively with components and operations thereof.

Figure 3:
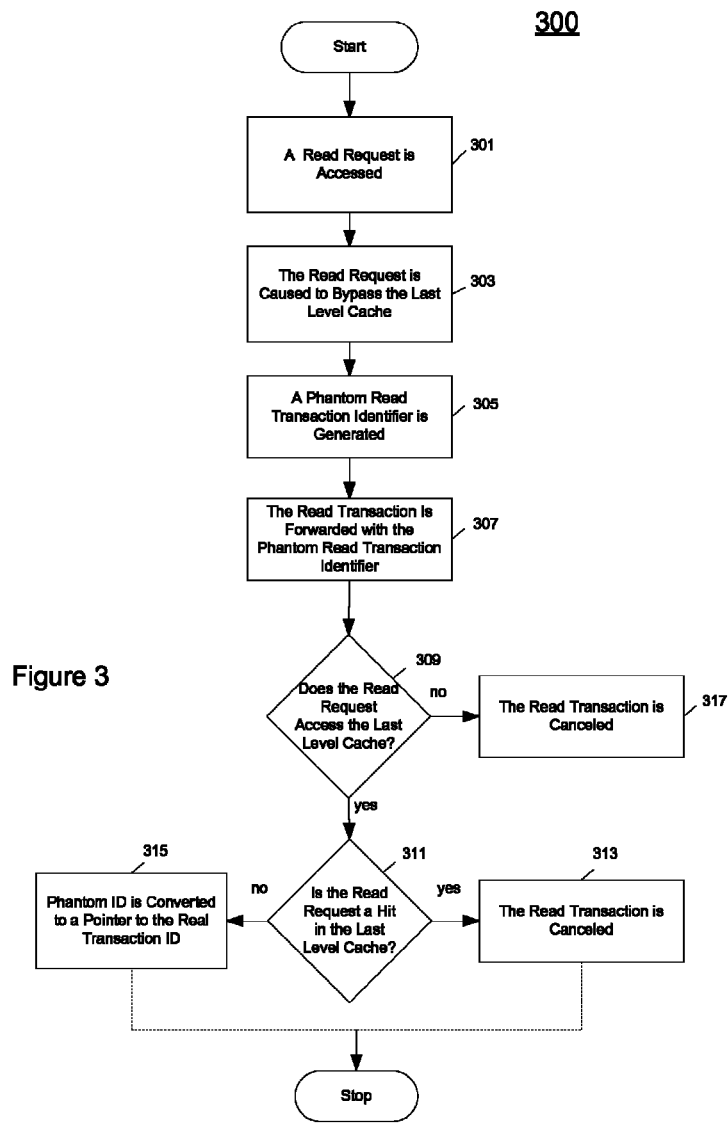
FIG. 3 shows a flowchart of the steps performed in a method for read request bypassing of a last level cache that interfaces with an external fabric according to one embodiment.

Method for Read Request Bypassing a Last Level Cache which Interfaces with an External Fabric According to One Embodiment FIG. 3 shows a flowchart 300 of the steps performed in a method for read request bypassing of a last level cache that interfaces with an external fabric according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, a read request is accessed for a read transaction.

At 303, the read request is caused to bypass the last level cache.

At 305, a phantom read transaction identifier is generated for the read transaction.

At 307, the read transaction is forwarded with the phantom read transaction identifier beyond a last level cache before the detection of a hit or miss with respect to the read transaction in the last level cache.

At 309, it is determined if the read request accesses the last level cache. If the read request does not access the last level cache, control moves to 317 (see description below). If the read request does access the last level cache, control moves to 311.

At 311, it is determined if the read request is a hit or a miss in the last level cache.

At 313, if it is determined that the read request is a hit in the last level cache the read transaction is canceled.

At 315, if it is determined that the read request is a miss in the last level cache the phantom read transaction identifier is converted to a pointer to the real transaction ID.

At 317, if at 309 it is determined that the read request does not access the last level cache, the read transaction is canceled.

With regard to exemplary embodiments thereof, methods and systems for read request bypassing a last level cache which interfaces with an external fabric are disclosed. A method includes identifying a read request for a read transaction, generating a phantom read transaction identifier for the read transaction and forwarding the read transaction with the phantom read transaction identifier beyond a last level cache before detection of a hit or miss with respect to the read transaction. The phantom read transaction identifier includes a pointer to a real read transaction identifier.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for read request bypassing a last level cache which interfaces with an external fabric, the method comprising:

accessing a read request for a read transaction;

generating a phantom read transaction identifier for said read transaction; and forwarding said read transaction with said phantom read transaction identifier beyond a last level cache before detection of a hit or a miss with respect to said read transaction, wherein said read transaction that is forwarded beyond said last level cache is canceled if said read transaction is a hit in said last level cache or does not access said last level cache, and wherein said phantom read transaction identifier is converted to a pointer to a real read transaction identifier if said read transaction is a miss in said last level cache.

2. The method of claim 1 wherein said phantom read transaction identifier comprises a bit set to differentiate said phantom read transaction identifier from said real read transaction identifier.

3. The method of claim 1 wherein for a 32 entry load queue said phantom read transaction identifier is associated with one bit of six bits.

4. The method of claim 1 further comprising supplying said phantom read transaction identifier from said last level cache.

5. The method of claim 1 wherein said real read transaction identifier is a pointer to a read queue in said last level cache.

6. A cache controller, comprising:

an accessor for accessing a read request for a read transaction;

a generator for generating a phantom read transaction identifier for said read transaction; and a forwarder for forwarding said read transaction with said phantom read transaction identifier beyond a last level cache before detection of a hit or a miss with respect to said read transaction, wherein said read transaction that is forwarded beyond said last level cache is canceled if said read transaction is a hit in said last level cache or does not access said last level cache, and wherein said phantom read transaction identifier is converted to a pointer to a real read transaction identifier if said read transaction is a miss in said last level cache.

7. The cache controller of claim 6 wherein said phantom read transaction identifier comprises a bit set to differentiate said phantom read transaction identifier from said real read transaction identifier.

8. The cache controller of claim 6 wherein for a 32 entry load queue said phantom read transaction identifier is associated with one bit of six bits.

9. The cache controller of claim 6 wherein said phantom read transaction identifier is supplied from said last level cache.

10. The cache controller of claim 6 wherein said real read transaction identifier is a pointer to a read queue in said last level cache.

11. A processor, comprising:
a CPU;
a cache system; and
a cache controller, wherein said cache controller comprises:
an accessor for accessing a read request for a read transaction;
a generator for generating a phantom read transaction identifier for said read transaction; and
a forwarder for forwarding said read transaction with said phantom read transaction identifier beyond a last level cache before detection of a hit or a miss with respect to said read transaction, wherein said read transaction that is forwarded beyond said last level cache is canceled if said read transaction is a hit in said last level cache or does not access said last level cache, and wherein said phantom read transaction identifier is converted to a pointer to a real read transaction identifier if said read transaction is a miss in said last level cache.

12. The processor of claim 11 wherein said phantom read transaction identifier comprises a bit set to differentiate said phantom read transaction identifier from said real read transaction identifier.

13. The processor of claim 11 wherein for a 32 entry load queue said phantom read transaction identifier is associated with one bit of six bits.

14. The processor of claim 11 wherein said phantom read transaction identifier is supplied from said last level cache.

15. The method of claim 1 wherein said generating said phantom read transaction identifier is performed by a cache controller.

* * * * *